United States Patent Office 3,244,008
Patented Apr. 5, 1966

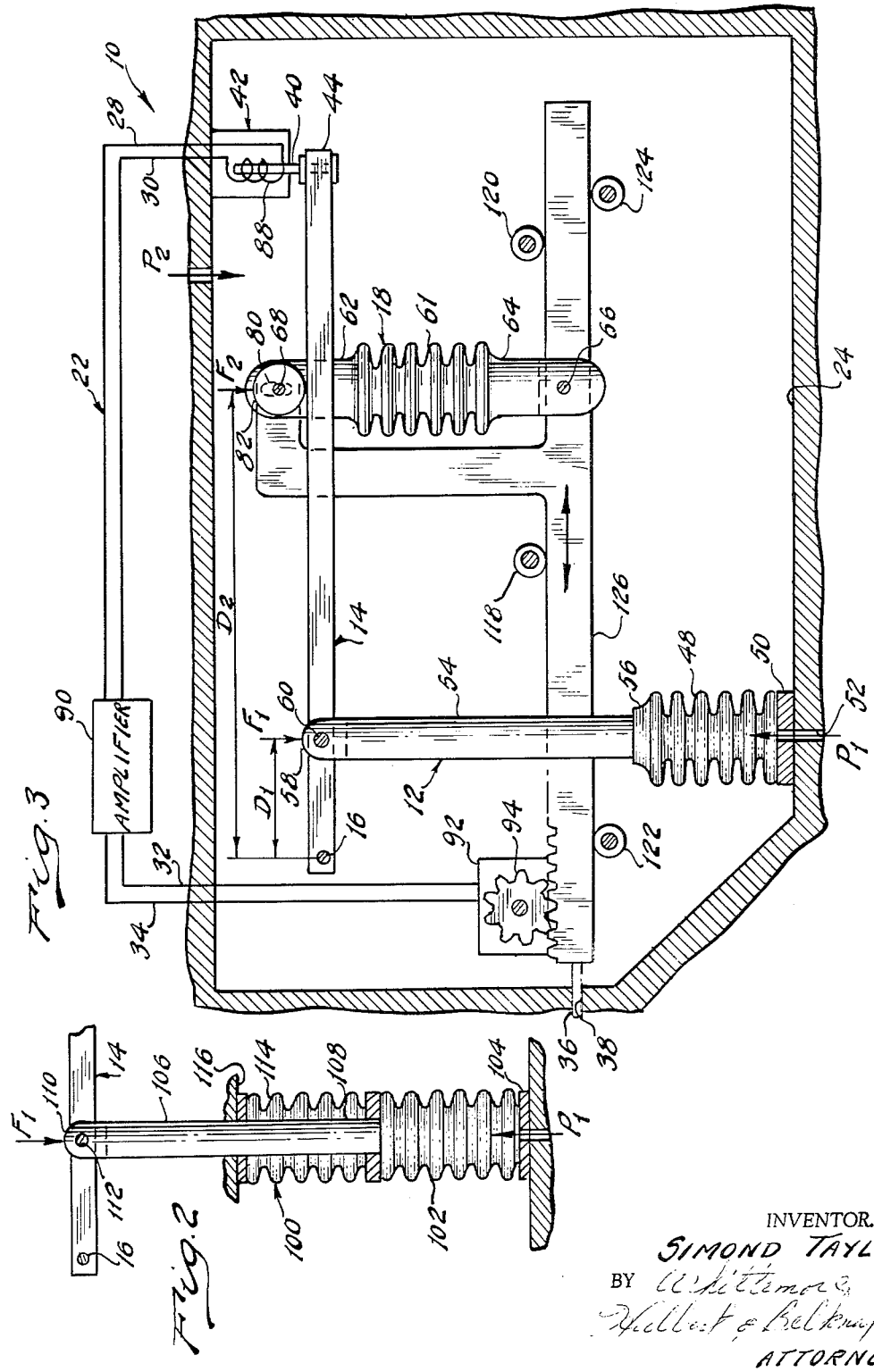

3,244,008
RATIO SENSING DEVICE
Simond Taylor, Livonia, Mich., assignor to Holley Carburetor Company, Warren, Mich., a corporation of Michigan
Filed Mar. 19, 1962, Ser. No. 180,665
12 Claims. (Cl. 73—407)

The invention relates to pressure responsive devices and refers more specifically to apparatus for sensing and indicating the ratio of two pressures.

In the past pressure ratio indicators have been relatively complicated so that their weight and expense precludes their use in many applications. Wherein prior pressure ratio indicators have been relatively uncomplicated they have usually also been inefficient, inaccurate or unreliable.

It is therefore one of the objects of the present invention to provide improved means for sensing and indicating the ratio between two pressures.

Another object is to provide a pressure ratio indicator comprising means for sensing two pressures and means responsive to the pressure sensing means for producing a linear movement proportional to the ratio between the sensed pressures.

Another object is to provide a pressure ratio indicator including a pivotally mounted lever, means for sensing two pressures and for producing movement of the lever in accordance with the ratio thereof and means responsive to movement of the lever for providing a linear movement linearly proportional to the ratio of the pressures.

Another object is to provide a pressure ratio indicator including a pivotally mounted lever, means to apply a force at a fixed point on the lever representative of the difference between a first and second pressure, means for applying a second force representative of the second pressure to the lever at a variable point along the lever whereby the lever is caused to move an amount representative of the ratio between the pressures, linearly movable means for moving the means for applying the second force to the lever along the length of the lever and means responsive to movement of the lever for producing movement of the linearly movable means an amount linearly proportional to the ratio of the pressures to balance the forces acting on the lever and bring the lever to a predetermined position.

Another object is to provide a pressure ratio indicator as set forth above wherein the linearly movable member is a rack and the means responsive to movement of the lever for moving the rack comprises a linear voltage differential transformer for producing an electrical signal the polartiy of which is determined by the direction of movement of the lever, means for amplifying the electrical signal, a motor energized in a direction determined by the polarity of the amplified signal and a pinion driven by the motor and engaged with the rack.

Another object is to provide a pressure ratio indicator as set forth above wherein the means for applying the first force to the lever includes a bellows operable to sense the pressure difference between the two pressures.

Another object is to provide a pressure ratio indicator as set forth above wherein the means for applying the second force to the lever includes an evacuated bellows carried by the movable member and exposed exteriorly to the second pressure.

Another object is to provide a pressure ratio indicator as set forth above wherein the means for applying the first force to the lever includes an evacuated bellows and a second bellows subjected to the difference between the two pressures connected to act in opposition to each other.

Another object is to provide a pressure ratio indicator as set forth above which is simple in construction, economical to manufacture and efficient in use.

Other objects and features of the invention will become apparent as the description proceeds, especially when taken in conjunction with the accompanying drawings, illustrating preferred embodiments of the invention, wherein:

FIGURE 2 is a diagrammatic illustration of a modification of a portion of the pressure ratio indicator illustrated in FIGURE 1.

FIGURE 3 is a diagrammatic illustration of a second modification of the pressure ratio indicator illustrated in FIGURE 1.

Figure 1:
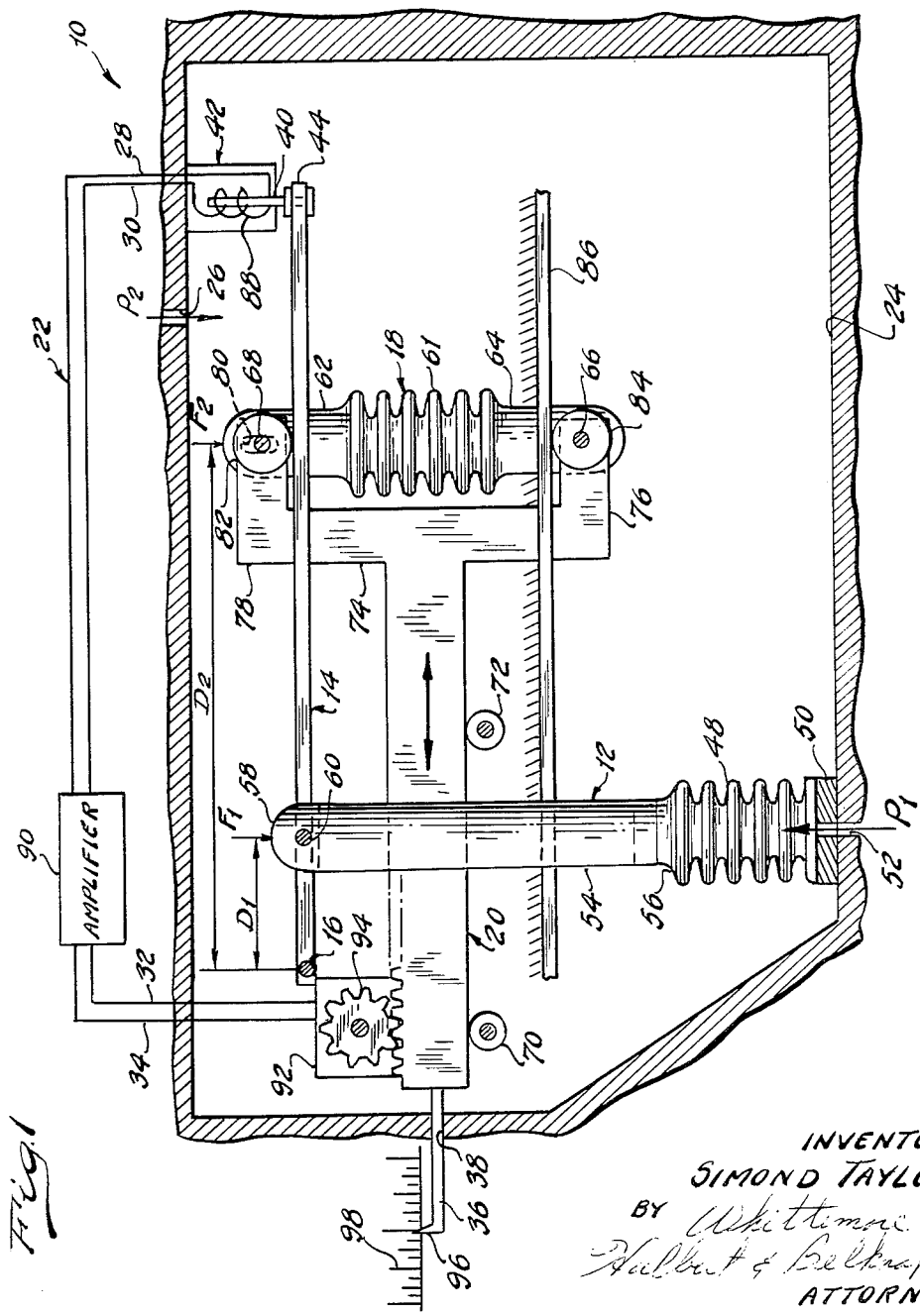
FIGURE 1 is a diagrammatic representation of a pressure ratio indicator constructed in accordance with the invention.

With particular reference to the figures, one embodiment of the present invention will now be disclosed in detail.

As shown in FIGURE 1 the pressure ratio indicator 10 comprises means 12 for sensing the difference between a first pressure $P_1$ and a second pressure $P_2$ and applying a force proportional thereto to the lever 14 mounted on pivot means 16. The pressure ratio indicator 10 further includes the means 18 for sensing the second pressure $P_2$ and applying a force proportional thereto to the lever 14 at a variable point therealong which means is supported for movement longitudinally of the lever 14 by the rack 20. The apparatus 22 for sensing the movement of the lever 14 and producing movement of the rack 20 in accordance therewith to reposition the lever 14 is also an integral part of the pressure ratio indicator 10.

In operation the physical constants of the apparatus 12, 18 and 14 are so chosen that the movement of the rack 20 by means 22 due to movement of the lever 14 required to position the lever so that the lever is always in a predetermined position is linearly proportional to the pressure ratio $P_1/P_2$.

More specifically the pressure ratio indicator 10 comprises a chamber 24 which is open to pressure $P_2$ through orifice 26. Pressure $P_1$ enters the bellows 48 in chamber 24 through orifice 52. The electrical conductors 28, 30, 32 and 34 extending into the chamber 24 and the indicating arm 36 protruding out of the chamber 24 through a conveniently sealed opening 38 complete the communication with the chamber 24.

Lever 14 as previously indicated is pivotally mounted within the chamber 24 on the pivot means 16. Lever 14 has the core 40 of a linear variable differential transformer 42 secured to the end 44 thereof by convenient means.

The means 12 for sensing the difference between pressures $P_1$ and $P_2$ includes a bellows 48 supported within the chamber 24 on a base member 50 which bellows is in interior communication with pressure $P_1$ through the orifice 52 as previously indicated. A mechanical linkage 54 is secured at the end 56 to the top of the bellows 48 as shown in FIGURE 1. The mechanical linkage 54 is further pivotally connected to the lever 14 at end 58 by the pivot means 60. Thus in operation force $F_1$ applied to the mechanical linkage 54 on expansion and contraction of the bellows 48 is applied to lever 14 to produce pivotal movement thereof about pivot means 16.

The means 18 for sensing the pressure $P_2$ comprises a bellows 18 having the mechanical linkage 62 secured to the top thereof and the mechanical linkage 64 secured to the bottom. The mechanical linkage 64 is connected at its lower end it pivot means 66 while the mechanical linkage 62 is pivotally connected at its upper end to the pivot means 68. Bellows 18 is evacuated so that on variations in the pressure $P_2$ within the chamber 24 the bellows 18 will be caused to contract or expand.

The rack 20 as indicated in FIGURE 1 is supported on rollers 70 and 72 for movement horizontally in opposite directions. The rack 20 is provided with a bifurcated end 74 having the arms 76 and 78 which support therebetween the pressure sensing means 18. Thus the pivot means 66 is pivotally secured to the arm 76 while the pivot means 68 is vertically movable within the slot 80 in the arm 78.

The roller 82 is rotatably secured to the pivot member 68 and transfers a force due to expansion and contraction of the bellows 61 to the lever 14. The roller 84 is secured for rotation to the pivot means 66 and moves along the track 86 whereby upward movement of the rack 20 is prevented.

Thus in operation on expansion and contraction of the bellows 61 a variable force $F_2$ is applied to the lever 14. Further as the rack 20 is caused to move horizontally the point of application of the force $F_2$ applied to the lever 14 through the roller 82 is varied longitudinally of the lever.

The means 22 for sensing the position of the lever 14 and providing linear movement of the rack 20 in response thereto includes the linear variable differential transformer 42, the coil 88 of which is held in a fixed position and the core 40 of which is supported on the end 44 of the lever 14 as previously indicated. The linear variable differential transformer 42 is provided with the usual source of electrical energy (not shown). Thus on pivotal movement of the lever 14 about the pivot mounting 16 therefor an electrical signal is provided through conductors 28 and 30 to the amplifier 90 having a polarity depending on the direction of pivoting of lever 14.

The amplified electrical signal from amplifier 90 is then passed through the conductors 32 and 34 to the motor 92 to produce rotation of the motor 92 in a direction determined by the polarity of the electrical signal produced by the linear variable differential transformer. Motor 92 operates in opposite directions to rotate the pinion 94 engaged with the rack 20 to cause horizontal movement of the rack 20 in opposite directions.

Thus in over-all operation on increase of pressure $P_2$ or decerease of pressure $P_1$ the forces $F_1$ and $F_2$ applied to the lever 14 through the pivot means 60 and the roller 82 will be such as to cause clockwise rotation of the lever 14 about the pivot mounting 16 therefor. Clockwise movement of the lever 14 about the pivot mounting 16 produces movement of the end 44 of lever 14 and the core 40 of the linear variable differential transformer 42 carired thereby whereby an electrical signal is produced by the linear variable differential transformer 42.

The electrical signal having a predetermined polarity due to the clockwise movement of the lever 14 is amplified in amplifier 90 and produces rotation of the motor 92 and therefore the pinion 94 driven thereby in a direction to move the rack 20 to the left in FIGURE 1 so that the point of application of the force $F_2$ applied to the lever 14 through the rollers 82 will be moved closer to the pivot means 16. The leftward movement of the member 20 will be continued until the forces $F_1$ and $F_2$ acting on the lever 14 through the pivot means 60 and the roller 82 are such as to bring the lever 14 back to its original horizontal position.

With the lever 14 back in its original horizontal position no driving signal for the motor will be produced by the linear variable differential transformer 42. The leftward movement of the rack 20 resquires to return the lever 14 to a horizontal position will be linearly proportional to the ratio of the pressures $P_1/P_2$.

Thus considering the force $F_1$ acting at the pivot means 60, through distance $D_1$ between the pivot means 60 and pivot means 16, as $P_1-P_2$ times the area of the bellows 48 ($A_{B1}$) and the force $F_2$ acting through the roller 82 on the lever 14, through distance $D_2$ between the pivot means 16 and pivot means 68, to be equal to $P_2$ times the area of the bellows 61 ($A_{B2}$) and taking the sum of the moments about the pivot point 16 due to the forces $F_1$ and $F_2$ the following equation results:

$$(P_1-P_2)A_{B1}D_1 = P_2 A_{B2} D_2 \qquad (1)$$

Equation (1) may be reduced to the following equation:

$$\frac{P_1}{P_2} = \frac{A_{B2}D_2}{A_{B1}D_1} + 1 \qquad (2)$$

Also since the bellows areas $A_{B1}$ and $A_{B2}$ are fixed quantities once they are chosen and the distance $D_1$ is also fixed the quantity $A_{B2}/A_{B1}D_1$ can be set equal to a constant K so that Equation (2) becomes $$P_1/P_2 = KD_2 + 1 \qquad (3)$$

From Equation (3) it will be obvious that the distance $D_2$ and therefore the linear movement of the rack 20 will be linearly proportional to the pressure ratio $P_1/P_2$.

Thus by providing appropirate indicating apparatus to indicate the linear movement of the rack 20 such as the arm 36 and pointer 96 in conjunction with the pressure ratio indicating scale 98 the pressure ratio $P_1/P_2$ may be indicated directly.

On further consideration of Equation (3) it will be seen that as the roller 82 approaches the pivot means 16 that the ratio $P_1/P_2$ will approach 1. In addition it will be understood that if lever 14 were extended to the left beyond the pivot means 16 that the apparatus illustrated in FIGURE 1 would be capable of reading pressure ratios approaching zero.

The modification of the invention shown in FIGURE 2 also provides a means by which pressure ratios approaching zero can be indicated. In accordance with FIGURE 2 the means 100 for applying a force $F_1$ to the lever 14 at a fixed distance from the pivot mounting means 16 thereof is substituted for the previously provided means 12. The force applying means 100 includes the bellows 102 exposed on the exterior to the pressure $P_2$ and on the interior to the pressure $P_1$ and which is mounted on the mounting block 104 in a manner similar to the bellows 48.

Further the means 100 includes the linkage 106 having the end 108 thereof secured to the top of the bellows 102 and the end 110 pivotally secured to the lever 14 by pivot means 112 in the manner of the linkage 54. In addition the means 100 includes the evacuated bellows 114 operable between the end 108 of the linkage 106 and a fixed abutment 116.

With the means 100 substituted for the means 12 in the structure of FIGURE 1 and again taking the sum of the moments about the pivot means 16 due to the forces $F_1$ and $F_2$ with force $F_1$ now being equal to $$P_1 - P_2(A_{B1}) + P_2 A_{B1}$$

Equation (3) reduces to the following.

$$P_1/P_2 = KD_2 \qquad (4)$$

The modification of the invention illustrated in FIGURE 3 differs from that of FIGURE 1 in that rollers 118, 120, 122 and 124 have been substituted for the rollers 70 and 72, the track 86 and the roller 84 provided in FIGURE 1. In addition the configuration of the rack 126 in the FIGURE 3 structure is slightly modified from the configuration of the rack 20 in the FIGURE 1 structure. The modification illustrated in FIGURE 3 requires fewer elements and provides improved control over the movement of the rack 126.

While one embodiment of the present invention has been disclosed in detail and two modifications thereof indicated it will be understood that other embodiments and modifications of the invention are contemplated. It is therefore the intention to include all such embodiments and modifications as are defined by the appended claims within the scope of the invention.

What I claim as my invention is:

1. A pressure ratio indicator comprising a pivotally mounted lever, a first pressure responsive bellows exposed on the interior to a first pressure and on the exterior to a second pressure, one end of which is secured in a fixed position, means pivotally connecting the other end of the first pressure responsive bellows to the lever at a fixed position therealong for applying a force to said lever transversely thereof in one direction to tend to pivotally move said lever in one direction, a second pressure responsive bellows located axially of the first pressure responsive bellows exposed exteriorly to the second of said pressures, one end of which is connected to the end of the first pressure responsive bellows connected to the lever and the other end of which is secured in a fixed position between the one end thereof and the lever, a linearly movable member, a third pressure responsive bellows physically carried by the linearly movable member and exposed on the exterior to the second of said pressures, said third pressure responsive bellows being engaged with said lever for applying a force at variable positions along the length of said lever in accordance with the position of said linearly movable member of a magnitude proportional to the second of said pressures, and in a direction opposite the force applied to said lever by the first and second pressure responsive bellows electromechanical means connected between said lever and said linearly movable member for sensing displacement of said lever from a predetermined position thereof and moving said linearly movable member in a direction to vary the location of application of the force due to said third pressure responsive bellows on said lever to return the lever to the predetermined position thereof and means operably associated with said linearly movable member for indicating the ratio of the pressures in accordance with the movement of the linearly movable member.

2. Structure as set forth in claim 1 wherein said linearly movable member comprises an elongated rack having an arm extending perpendicularly thereto centrally thereof which arm terminates in a portion extending parallel to the rack, a plurality of rollers positioned in engagement with opposite surfaces of the rack for guiding the rack in longitudinal movement parallel to the lever with the lever in the predetermined position thereof, a pivot member connected to the rack adjacent the rack arm, a slot in the parallel extending portion of the rack arm extending perpendicularly to the rack, a second pivot member extending through said slot, a roller pivotally mounted on one end of said second pivot member in engagement with said lever and said third pressure responsive bellows is pivotally secured at opposite ends to the other ends of the pivot members.

3. Structure as set forth in claim 1 wherein said linearly movable member comprises a rack having a bifurcated end including two spaced apart arms, and further including a pair of horizontally aligned spaced apart rollers on which said rack moves linearly, a track positioned in parallel spaced relation to said horizontally aligned rollers, a pivot member extending through one of said arms of the bifurcated end of the linearly movable member, a roller in engagement with said track mounted on one end of said pivot member, a slot in the other arm of the bifurcated end of the linearly movable member extending perpendicularly to said track, a second pivot member extending through said slot, a roller pivotally mounted on one end of said second pivot member in engagement with said lever and wherein said third pressure responsive bellows is pivotally secured at opposite ends to the other ends of the pivot members.

4. Structure as set forth in claim 3 wherein the electro-mechanical means comprises a linear variable differential transformer including a core and a coil, one of which is secured in a fixed position and the other of which is secured to the lever for movement therewith, amplifier means connected in series with the differential transformer, a reversible electric motor connected to the amplifier means and a pinion driven by said electric motor in accordance with the magnitude and direction of electric energy fed thereto engaged with said rack for moving the rack linearly to a position representative of the ratio between the first and second pressures.

5. A pressure ratio indicator comprising a chamber, means for introducing a first pressure into the chamber, a lever pivotally mounted at one end within the chamber, a pressure responsive bellows fixedly mounted at one end within the chamber and pivotally connected to the lever centrally thereof at the other end, means for introducing a second pressure into said pressure responsive bellows whereby the pressure responsive bellows will sense the difference between the first and second pressures, a linearly movable member positioned within said chamber for movement substantially parallel to said lever, a second pressure responsive bellows carried by said linearly movable member and engaged with said lever for applying a force determined by said first pressure at variable points along said lever in opposition to the force provided on said lever by said first pressure responsive bellows through said pivot connection with said lever, a linear variable differential transformer having a core member and a coil member one of which is secured to the other end of said lever and the other of which is secured in a fixed position within said chamber in operative relation to the one member for producing an electric signal representative of the movement of the lever, means for moving the linear member in opposite directions in accordance with the signal produced by the transformer including an electric motor connected to said transformer, rack and pinion means connected between said motor and said linearly movable member for moving the linearly movable member in opposite directions in proportion to the signal developed by said transformer to maintain the lever in a substantially constant position and means operably associated with said linearly movable member for indicating the ratio of the two pressures in accordance with the position of the linearly movable member.

6. Structure as set forth in claim 5 and further including a track within said chamber extending substantially parallel to said lever and a pair of rollers in spaced apart relation in parallel alignment with said track wherein said linearly movable member includes an elongated portion having a rack part of the rack and pinion means at one end supported for linear movement over said rollers and further includes spaced apart portions at the other end thereof and wherein the second pressure responsive bellows is pivotally secured to one of the spaced apart portions of the linearly movable member, a roller secured to one spaced apart portion of said linearly movable member in engagement with said track, a further wheel secured to the other end of the second pressure responsive bellows engaged with said lever and a lost motion connection between the other spaced apart portion of said linearly movable member and said other end of said second pressure responsive bellows.

7. Structure as set forth in claim 5 and further including a plurality of longitudinally spaced apart rollers defining a track therebetween and wherein said linearly movable member includes a rack of the rack and pinion means on one end thereof and an offset portion on the other end thereof and wherein the second pressure responsive bellows is pivotally connected to said linearly movable member at one end adjacent the offset portion thereof and is connected to a roller in engagement with the lever at the other end thereof and a lost motion connection between the other end of the second pressure responsive bellows and the offset portion of said rack.

8. Structure as set forth in claim 5 and further including a third pressure responsive bellows fixedly secured at one end within said chamber and secured at the other end to said other end of said first pressure responsive bellows in series opposition thereto.

9. A pressure ratio indicator comprising a pivotally mounted lever, first pressure responsive means responsive to the difference between two pressures connected between a fixed abutment and the lever for applying a force in accordance with the difference between the two pressures to the lever to tend to pivot the lever in one of two opposite directions, linearly movable means movable parallel to the lever with the lever in a predetermined position, second pressure responsive means responsive to one of the two pressures connected to the linearly movable means for movement therewith along the length of the lever and engaged with the lever for applying a force on the lever proportional to the one of said pressures at a variable point therealong in accordance with the position of the linearly movable means to tend to pivot the lever in the other of said directions, means operably associated with the lever for sensing the position of the lever and moving the linearly movable means in a direction such that the force applied to the lever by the second pressure responsive means tends to move the lever back to the predetermined position thereof and means operably associated with said linearly movable means for indicating the ratio of said pressures in accordance with the movement of the linearly movable means.

10. Structure as set forth in claim 9 wherein the first pressure responsive means comprises a pair of axially aligned bellows having their remote ends secured in fixed positions and their adjacent ends connected to each other and to the lever, means for exposing the interior of one of the bellows to the second of said pressures and means for exposing the exterior of both of said bellows to the first of said pressures.

11. Structure as set forth in claim 9 wherein said linearly movable means comprises a rack having a bifurcated end including two spaced apart arms, and further including a pair of horizontally aligned spaced apart rollers on which said rack moves linearly, a track positioned in parallel spaced relation to said horizontally aligned rollers, a pivot member extending through one of said arms of the bifurcated end of the linearly movable means, a roller in engagement with said track mounted on one end of said pivot member, a slot in the other arm of the bifurcated end of the linearly movable means extending perpendicularly to said track, a second pivot member extending through said slot, a roller pivotally mounted on one end of said second pivot member in engagement with said lever and said second pressure responsive means is pivotally secured at opposite ends to the other ends of the pivot members.

12. Structure as set forth in claim 9 wherein said linearly movable means comprises an elongated rack having an arm extending perpendicularly thereto centrally thereof which arm terminates in a portion extending parallel to the rack, a plurality of rollers positioned in engagement with opposite surfaces of the rack for guiding the rack in longitudinal movement parallel to the lever with the lever in the predetermined position thereof, a pivot member connected to the rack adjacent the rack arm, a slot in the parallel extending portion of the rack arm extending perpendicularly to the rack, a second pivot member extending through said slot, a roller pivotally mounted on one end of said second pivot member in engagement with said lever and said second pressure responsive means is pivotally secured at opposite ends to the other ends of the pivot members.

References Cited by the Examiner

UNITED STATES PATENTS

| | | | |
|---|---|---|---|
| 2,521,477 | 9/1950 | Pellettere. | |
| 2,857,739 | 10/1958 | Wright | 73—407 |
| 3,049,007 | 8/1962 | Joline | 73—182 |
| 3,051,002 | 8/1962 | Rawlings | 73—386 |
| 3,068,699 | 12/1962 | Fischer | 73—386 |

LOUIS R. PRINCE, *Primary Examiner.*

ROBERT L. EVANS, RICHARD QUEISSER,
*Examiners.*